UNITED STATES PATENT OFFICE.

JOSEPH FRIEDRICH VON MERING, OF STRASBURG, ALSACE, GERMANY.

CHLORALFORMAMIDE.

SPECIFICATION forming part of Letters Patent No. 425,040, dated April 8, 1890.

Application filed July 20, 1889. Serial No. 318,161. (No specimens.) Patented in Belgium May 3, 1889, No. 86,090; in Germany May 3, 1889, No. 50,586, and in England May 3, 1889, No. 7,391.

*To all whom it may concern:*

Be it known that I, JOSEPH FRIEDRICH VON MERING, professor of natural philosophy, a subject of the German Emperor, residing at 27 Schiffleitgasse, Strasburg, Alsace, German Empire, have invented certain new and useful Improvements in a Process for the Production of a Substance to be called "Chloralformamide" or "Chloralamide," (for which I have obtained patents in the following countries: in Belgium under date of May 3, 1889, and numbered 86,090; in Germany under date of May 3, 1889, and numbered 50,586, and in Great Britain under date of May 3, 1889, and numbered 7,391;) and I do hereby declare the following to be a full, clear, and exact description of the invention, such as will enable others skilled in the art to which it appertains to make and use the same.

Chloral or chloral hydrate has taken a prominent place in the arts and in surgery, as well as medical treatments, by reason of its high medicinal and more especially its soporific and antiseptic properties; yet it possesses the disadvantage of being readily and speedily decomposed, while its antiseptic properties are limited as well as of limited duration. It has the further disadvantage, when used medicinally and internally, of powerfully affecting the action of the heart, and acts detrimentally upon the digestive organs.

The object of this invention is to provide a substitute for the chloral hydrate that possesses not only all its advantageous properties without any of the disadvantages referred to, but possesses such advantageous properties to a higher degree—namely, a substitute that is more fixed and more permanent in its effect—and this substitute I have discovered and called it "chloralformamide," or, for short, "chloralamide," ($C_2HCl_3OCHONH_2$.) This substitute I obtain by the action of chloral ($C_2HCl_3O$) on formamide ($CHONH_2$) in the proportion of their molecular weights. By this method the mixture becomes gradually warm and thickens until it becomes a solid crystalline mass, which is the chloralformamide or chloralamide referred to. If this is dissolved in water or other solvent and the chloralformamide allowed to crystallize out, colorless as well as odorless crystals are obtained that have a melting-point of 115° to 116° centigrade, and are soluble in water and readily soluble in alcohol, ether, acetic ether, glycerine, and acetone. Dissolved in water the choralamide does not undergo decomposition, as is the case with chloral hydrate, and possesses the soporific and antiseptic properties of the latter, but without corrosive action, has a mild and slightly bitter taste, and is odorless, has no effect upon the action of the heart, nor disturbing action upon the digestive organs, while its antiseptic properties are more permanent than those of the chloral hydrate.

Having described my invention, what I claim, and desire to secure by Letters Patent, is—

The process of producing chloralformamide, which consists in treating chloral with formamide.

In testimony whereof I affix my signature in presence of two witnesses.

JOSEPH FRIEDRICH VON MERING.

Witnesses:
FELIX S. JOHNSON,
FRED. E. S. FELDEN.